US012662109B2

(12) United States Patent
Masuko et al.

(10) Patent No.: US 12,662,109 B2
(45) Date of Patent: Jun. 23, 2026

(54) VEHICLE CONTROLLER, VEHICLE, VEHICLE CONTROL METHOD, AND COMPUTER-READABLE NON-TRANSITORY STORAGE MEDIUM

(71) Applicant: HONDA MOTOR CO., LTD., Tokyo (JP)

(72) Inventors: Taiki Masuko, Tokyo (JP); Yoshihiro Sunaga, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/065,697

(22) Filed: Feb. 27, 2025

(65) Prior Publication Data

US 2025/0289408 A1 Sep. 18, 2025

(30) Foreign Application Priority Data

Mar. 14, 2024 (JP) ................................. 2024-040194

(51) Int. Cl.
*B60W 20/10* (2016.01)
*B60W 10/04* (2006.01)

(52) U.S. Cl.
CPC ............ *B60W 20/10* (2013.01); *B60W 10/04* (2013.01)

(58) Field of Classification Search
CPC .. B60L 7/14; B60L 50/16; B60L 58/12; B60L 2210/40; B60L 2220/14; B60L 2270/145; B60W 10/04; B60W 10/06; B60W 10/08; B60W 10/11; B60W 10/115; B60W 20/00; B60W 20/10; B60W 30/025; B60W 2510/1005; B60W 2520/10; B60W 2540/10; B60W 2540/106; B60W 2710/0666; B60W 2710/0672; B60W 2710/083; B60W 2710/085; B60W 2710/1022; B60W 2710/1027; B60W 2710/1055; F02D 11/105; F02D 2250/18; F02D 2250/26; Y02T 10/40; Y02T 10/62; Y02T 10/64; Y02T 10/70; Y02T 10/7072; Y02T 10/72
See application file for complete search history.

(56) References Cited

U.S. PATENT DOCUMENTS

| | | | | |
|---|---|---|---|---|
| 2016/0185336 A1* | 6/2016 | Ueno | .................. | B60W 10/115 180/65.265 |
| 2018/0126852 A1* | 5/2018 | Moriya | ................. | B60L 3/0023 |
| 2018/0237023 A1* | 8/2018 | Orita | ..................... | B60W 30/20 |
| 2023/0318501 A1* | 10/2023 | Yamamoto | ............. | H02P 23/04 701/22 |
| 2023/0331095 A1* | 10/2023 | Inamitsu | .................. | B60L 7/18 |

FOREIGN PATENT DOCUMENTS

| | | |
|---|---|---|
| JP | 2020-156160 A | 9/2020 |
| WO | 2014/091917 A1 | 6/2014 |

* cited by examiner

*Primary Examiner* — Peter D Nolan
*Assistant Examiner* — Ce Li Li
(74) *Attorney, Agent, or Firm* — Carrier, Shende & Associates P.C.; Joseph P. Carrier; Fulchand P. Shende

(57) ABSTRACT

In a vehicle controller, when output driving torque switches between positive and negative, a target driving torque setting unit executes a torque limiting process that limits the absolute value of the target driving torque to a predetermined limit value or less, and the target driving torque setting unit ends the torque limiting process based on a determination by a determination unit that a temporal integral has reached a predetermined value.

6 Claims, 10 Drawing Sheets

ENG 18

42

44

32

46

48

50

53

56

54

52

30

60

62

38

58

40

22

22

12

20

36

24

34

28

26

INV 28

INV 26

VCU 16

BAT 14

EV DRIVING MODE

FIG. 3   SERIES DRIVING MODE

FIG. 4   ENGINE DRIVING MODE

FIG. 6

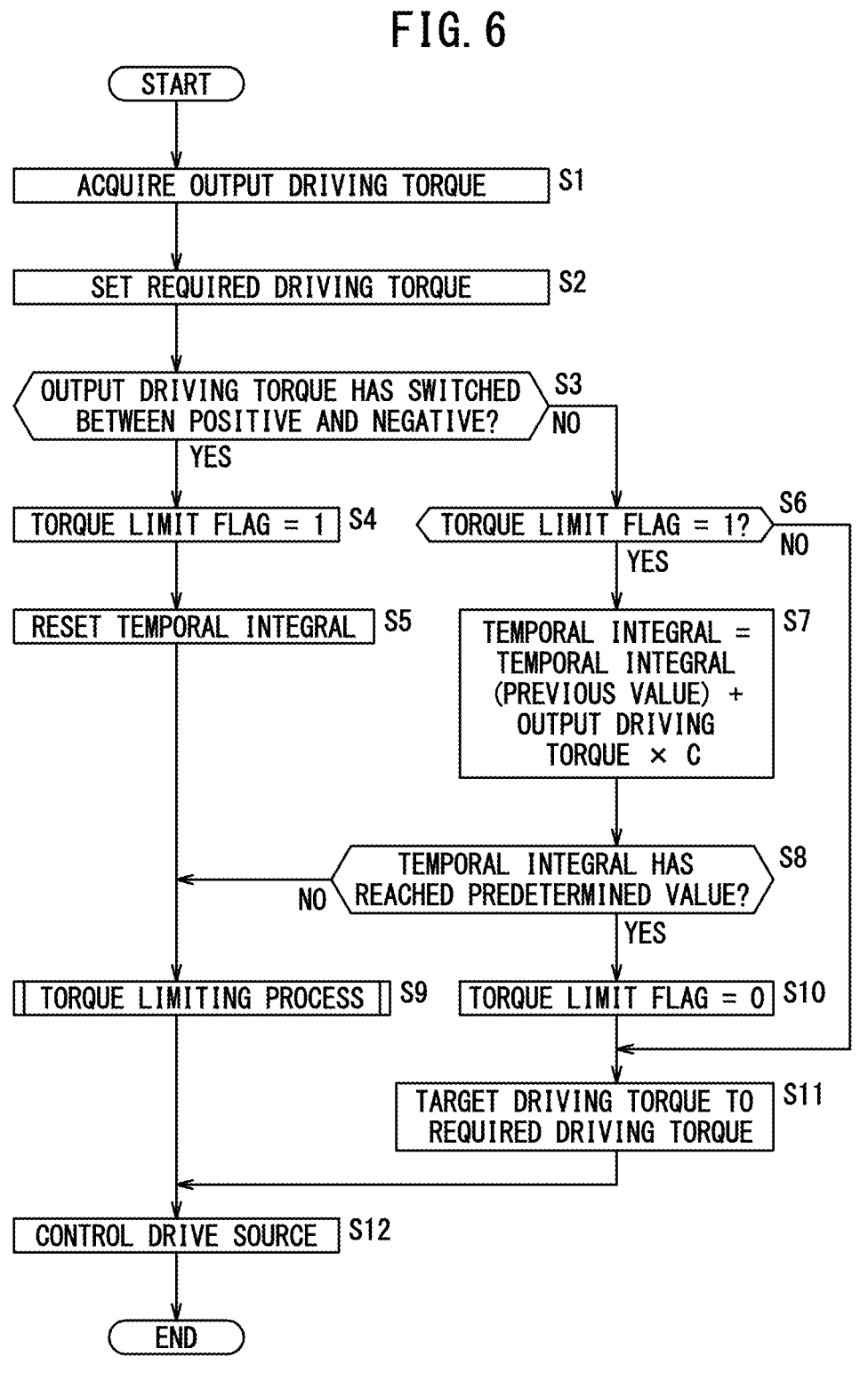

START

ACQUIRE OUTPUT DRIVING TORQUE    S1

SET REQUIRED DRIVING TORQUE    S2

OUTPUT DRIVING TORQUE HAS SWITCHED BETWEEN POSITIVE AND NEGATIVE?    S3
NO
YES

TORQUE LIMIT FLAG = 1    S4        TORQUE LIMIT FLAG = 1?    S6
NO
YES

RESET TEMPORAL INTEGRAL    S5

TEMPORAL INTEGRAL = TEMPORAL INTEGRAL (PREVIOUS VALUE) + OUTPUT DRIVING TORQUE × C    S7

TEMPORAL INTEGRAL HAS REACHED PREDETERMINED VALUE?    S8
NO
YES

TORQUE LIMITING PROCESS    S9        TORQUE LIMIT FLAG = 0    S10

TARGET DRIVING TORQUE TO REQUIRED DRIVING TORQUE    S11

CONTROL DRIVE SOURCE    S12

END

VEHICLE CONTROLLER, VEHICLE, VEHICLE CONTROL METHOD, AND COMPUTER-READABLE NON-TRANSITORY STORAGE MEDIUM

CROSS-REFERENCE TO RELATED APPLICATIONS

This application is based upon and claims the benefit of priority from Japanese Patent Application No. 2024-040194 filed on Mar. 14, 2024, the contents of which are incorporated herein by reference.

BACKGROUND OF THE INVENTION

Field of the Invention

The present disclosure relates to a vehicle controller, a vehicle, a vehicle control method, and a Computer-Readable Non-Transitory Storage Medium.

Description of the Related Art

In WO 2014/091917 A1, a driving torque controller for a vehicle is disclosed. When a target driving torque is switched from negative to positive, the driving torque control device limits the driving torque in order to suppress the acceleration shock occurring when the gear backlash is eliminated.

SUMMARY OF THE INVENTION

In WO 2014/091917 A1, time counting is started when the driving torque limitation is started, and the driving torque limitation is ended when the timer becomes equal to or larger than the end judgment threshold. For example, if a period in which the driving torque is smaller than the limit value is present in the driving torque limit period, there is a case where backlash is not eliminated even if the timer becomes equal to or larger than the end judgment threshold. Therefore, the driving torque limitation may end even though the backlash has not yet been eliminated, resulting in that the acceleration shock may occur.

An object of the present invention is to solve the aforementioned problem.

A first aspect of the present disclosure is a vehicle controller including a target driving torque setting unit configured to set a target driving torque for a drive source that drives a drive wheel provided to a vehicle, an output driving torque acquisition unit configured to acquire the output driving torque of the drive source, a control unit configured to control the drive source in accordance with the target driving torque, a calculation unit configured to calculate a temporal integral of the output driving torque after the output driving torque switches between positive and negative, or calculate a temporal integral of the target driving torque after the required driving torque for the drive source switches between positive and negative, and a determination unit configured to determine whether the temporal integral calculated by the calculation unit has reached a predetermined value, wherein when the output driving torque or the required driving torque switches between positive and negative, the target driving torque setting unit executes a torque limiting process that limits an absolute value of the target driving torque to be equal to or less than a predetermined limit value, and the target driving torque setting unit terminates the torque limiting process based on a determination that the temporal integral has reached the predetermined value.

A second aspect of the present disclosure is a vehicle including the vehicle controller of the first aspect.

A third aspect of the present disclosure is a vehicle control method comprising: a target driving torque setting step of setting a target driving torque of a drive source that drives a drive wheel provided to a vehicle; an output driving torque acquisition step of acquiring an output driving torque of the drive source; a control step of controlling the drive source in accordance with the target driving torque; a calculation step of calculating a temporal integral of the output driving torque after the output driving torque switches between positive and negative, or calculating a temporal integral of the target driving torque after the required driving torque for the drive source switches between positive and negative; and a determination step of determining whether the temporal integral calculated in the calculation step has reached a predetermined value, wherein when the output driving torque or the required driving torque is switched between positive and negative, in the target driving torque setting step, a torque limiting process is performed for limiting an absolute value of the target driving torque to be equal to or less than a predetermined limit value, and the torque limiting process is terminated in the target driving torque setting step based on a fact that it is determined in the determining step that the temporal integral has reached the predetermined value.

A fourth aspect of the present disclosure is a program that causes a computer to execute the vehicle control method according to the third aspect.

The present disclosure can provide a better vehicle controller, vehicle, vehicle control method, and program.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a system diagram showing the configuration of a drive train of a vehicle in an embodiment;

FIG. 2 is a diagram showing motive power and electric power supply paths in an EV driving mode;

FIG. 6 is a flowchart of a drive source control process performed by the vehicle controller in one embodiment;

DETAILED DESCRIPTION OF THE INVENTION

Figure 3:
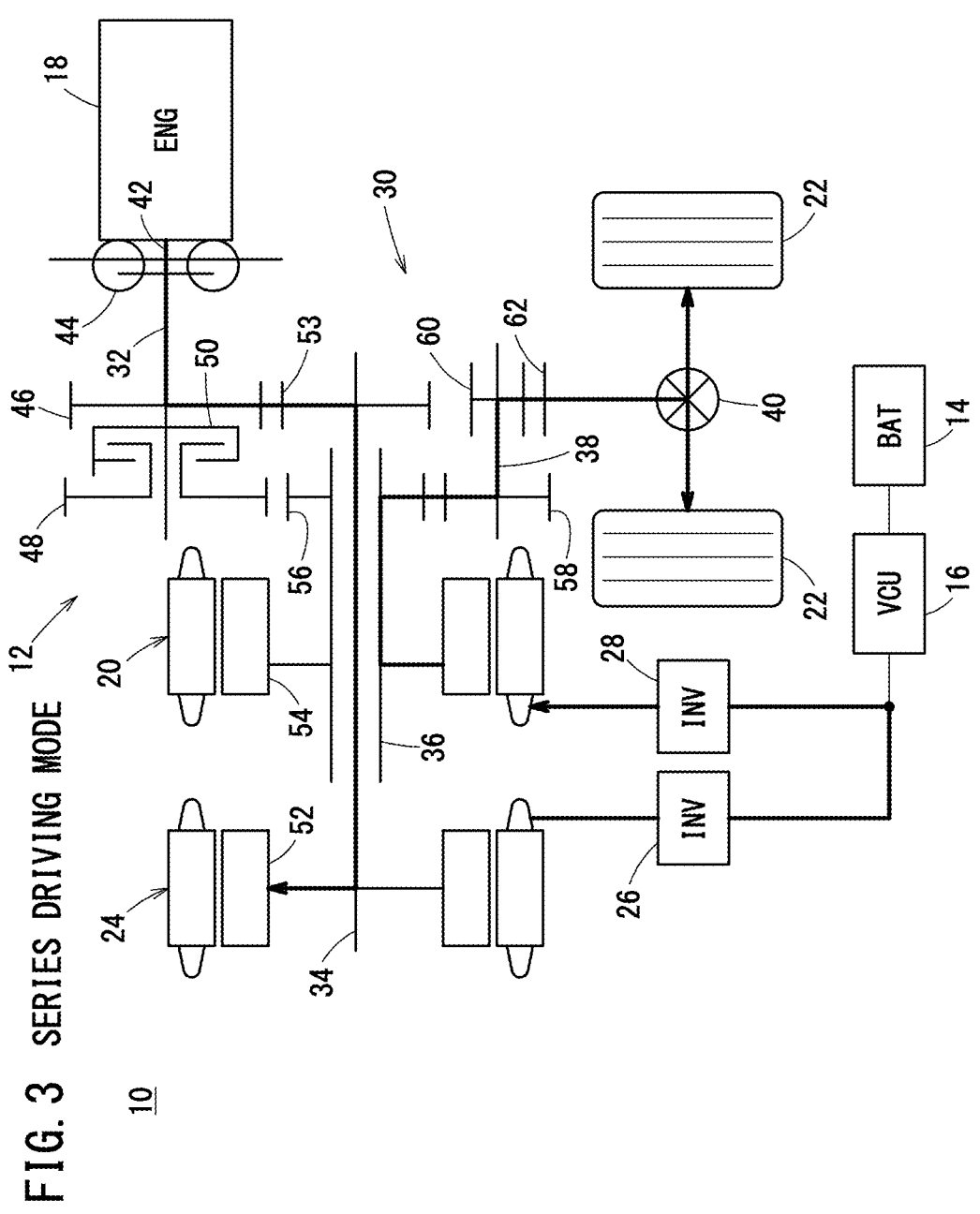
FIG. 3 is a diagram showing motive power and electric power supply paths in a series driving mode.

In the case of a vehicle having a drive motor as a drive source for driving drive wheels, the output driving torque of the drive motor is negative because the drive motor performs regeneration when the driver is not depressing the accelerator pedal. Moreover, when the driver depresses the accelerator pedal, the drive motor performs power running and thus the output driving torque of the drive motor is positive. Because a gear is interposed between the drive motor and the drive wheel, when the output driving torque of the drive motor switches between positive and negative, rattling noise may occur.

Therefore, conventionally, the output driving torque of the drive motor is limited until a predetermined time elapses from the time when the output driving torque of the drive motor switches between positive and negative. Thereby the limit on the output driving torque of the drive motor is lifted after the backlash of the gear is eliminated, resulting in that the rattling noise of the gear can be suppressed.

However, there is a possibility that, depending on the amount of operation on the accelerator pedal by the driver, the limit on the output driving torque of the drive motor will be lifted before the backlash of the gear is eliminated and thus the rattling noise of the gear will not be suppressed.

Even vehicles having an engine as a drive source for driving the drive wheels have the same problem as described above.

The present disclosure can suppress the rattling noise of the gear regardless of the amount of operation of the accelerator pedal by the driver.

Embodiment

A vehicle controller, a vehicle, a vehicle control method, and a program according to an embodiment will be described below with reference to the drawings. A program (computer program, computer software) according to the present embodiment may also be referred to as a computer program product. The computer program product is not limited to computer programs recorded on the recording medium, but also includes computer programs transmitted, distributed, and downloaded via the Internet or the like.

[Overall Configuration]

Figure 1:
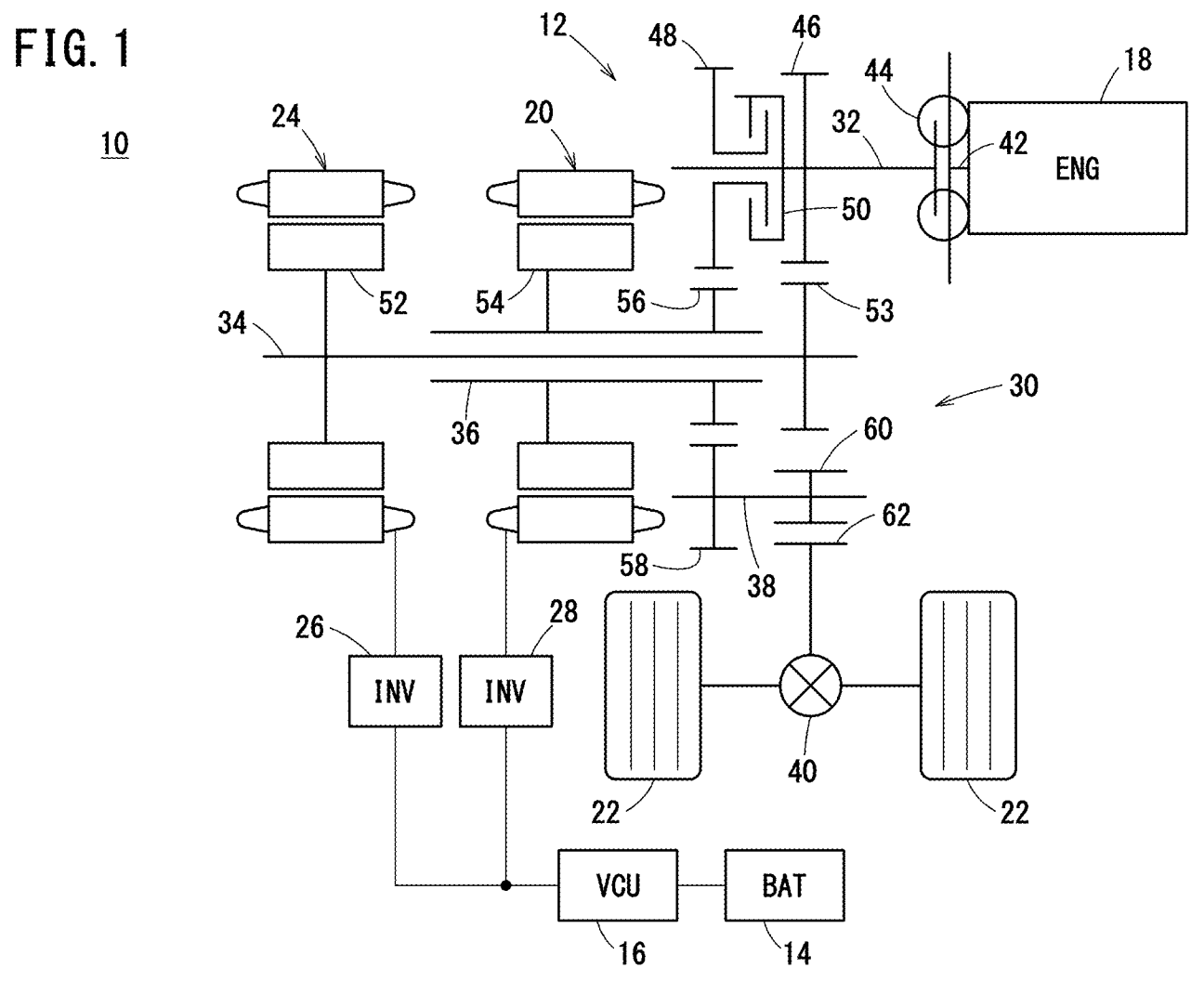

FIG. 1 is a system diagram showing the configuration of a drive train of a vehicle 10 in one embodiment. The vehicle 10 includes a drive unit 12, a battery 14, and a voltage control unit 16.

The drive unit 12 has an engine 18 and a drive motor 20 as drive sources. The drive force of the engine 18 or the drive motor 20 drives drive wheels 22, which are the front wheels of the vehicle 10. In one embodiment, the vehicle 10 is a front wheel drive vehicle but the vehicle 10 may be a rear wheel drive vehicle. The vehicle 10 may be an all-wheel drive vehicle.

The battery 14 is, for example, a lithium-ion battery, a nickel-hydrogen battery, etc. The voltage control unit 16 boosts the voltage of the DC power output from the battery 14 and outputs the boosted voltage to the drive unit 12. In addition, the voltage control unit 16 steps down the DC power output from the drive unit 12 and outputs the stepped-down DC power to the battery 14. The voltage control unit 16 is, for example, a DC-DC converter.

[Construction of Drive Unit]

The drive unit 12 includes a generator 24, an inverter 26, an inverter 28, and a transmission mechanism 30 in addition to the engine 18 and the drive motor 20.

The generator 24 is connected to the battery 14 via the inverter 26 and the voltage control unit 16. The battery 14 is charged by the electric power generated at the generator 24. AC power generated at the generator 24 is converted into DC power by the inverter 26. The DC power output from the inverter 26 is stepped down by the voltage control unit 16 and supplied to the battery 14.

The drive motor 20 is connected to the battery 14 via the inverter 28 and the voltage control unit 16. When the drive motor 20 performs power running, the drive motor 20 is driven by the electric power of the battery 14. The DC power output from the battery 14 is boosted at the voltage control unit 16. The DC power output from the voltage control unit 16 is converted into AC power by the second inverter and supplied to the drive motor 20. When the drive motor 20 regenerates electric power, the battery 14 is charged by the electric power generated at the drive motor 20. The AC power generated at the drive motor 20 is converted into DC power by the inverter 28. The DC power output from the inverter 28 is stepped down by the voltage control unit 16 and supplied to the battery 14.

The transmission mechanism 30 includes an input shaft 32, a generator shaft 34, a motor shaft 36, a countershaft 38, and a differential mechanism 40.

The input shaft 32 is placed on the axis of a crank shaft 42 of the engine 18. The motive power of the crank shaft 42 is transmitted to the input shaft 32 via a damper 44. The input shaft 32 is provided with an output gear 46 that rotates together with the input shaft 32. The input shaft 32 is also provided with an output gear 48. A clutch 50 is provided between the input shaft 32 and the output gear 48. The engagement of the clutch 50 results in a state where motive power is transmitted between the input shaft 32 and the output gear 48. The disengagement of the clutch 50 results in a state where no motive power is transmitted between the input shaft 32 and the output gear 48.

The generator shaft 34 is connected to a generator rotor 52 of the generator 24. The generator shaft 34 rotates together with the generator rotor 52. The generator shaft 34 is provided with an input gear 53 that rotates together with the generator shaft 34. The input gear 53 is meshed with the output gear 46 of the input shaft 32.

The drive force of the engine 18 is transmitted to the generator 24 via the input shaft 32 and the generator shaft 34, whereby power generation is performed at the generator 24.

The motor shaft 36 is placed on the same axis as the generator shaft 34. Part of the generator shaft 34 is inserted into the inner periphery of the motor shaft 36. The motor shaft 36 is connected to a motor rotor 54 of the drive motor 20. The motor shaft 36 rotates with the motor rotor 54. The motor shaft 36 is also provided with an output gear 56 that rotates together with the motor shaft 36. The output gear 56 is meshed with the output gear 48 of the input shaft 32 and an input gear 58 of the countershaft 38, which will be described later.

The countershaft 38 has the input gear 58 that rotates with the countershaft 38. The countershaft 38 also has an output gear 60 that rotates with the countershaft 38. The output gear 60 is meshed with a ring gear 62 of the differential mechanism 40.

[Driving Mode]

Driving modes of the drive unit 12 will be described. The drive unit 12 of one embodiment is switchable between three modes: EV driving mode, series driving mode, and engine driving mode.

(EV Driving Mode)

Figure 2:
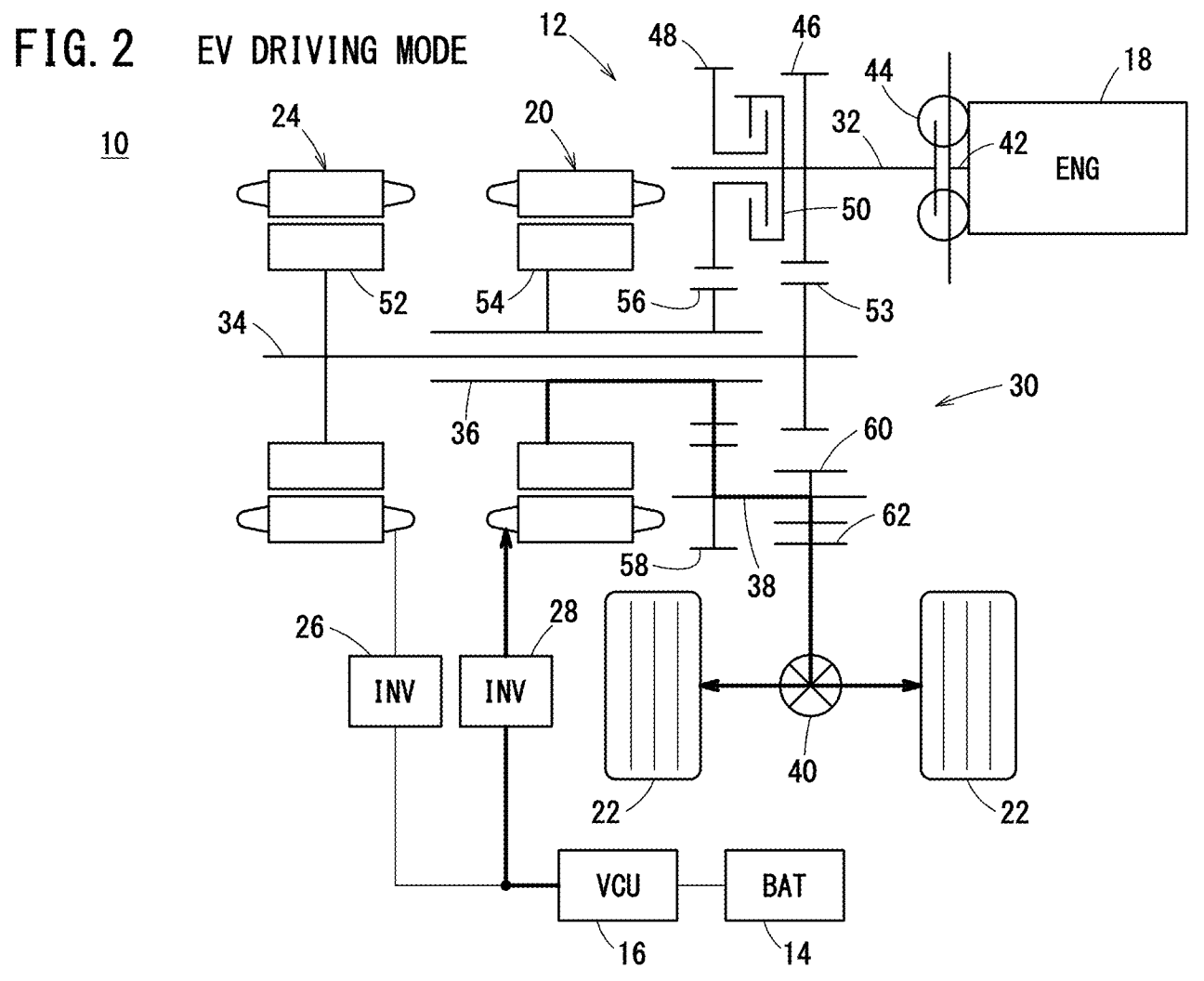

FIG. 2 is a diagram showing motive power and electric power supply paths in an EV driving mode. In FIG. 2, the motive power supply path and the electric power supply path are indicated by arrows.

In the EV driving mode, the engine 18 is stopped and the drive motor 20 is driven by the electric power supplied from the battery 14. In the EV driving mode, the clutch 50 is disengaged to prevent motive power from being transmitted between the input shaft 32 and the output gear 48. The drive force of the drive motor 20 is transmitted to the drive wheels 22 via the motor shaft 36, the countershaft 38, and the differential mechanism 40, thereby rotating the drive wheels 22.

(Series Driving Mode)

FIG. 3 is a diagram showing motive power and electric power supply paths in a series driving mode. In FIG. 3, the motive power supply path and the electric power supply path are indicated by arrows.

In the series driving mode, the generator 24 is caused to generate electric power by the drive force of the engine 18, whereby the drive motor 20 is driven by the electric power generated by the generator 24. In the series driving mode, the clutch 50 is disengaged to prevent motive power from being transmitted between the input shaft 32 and the output gear 48. The drive force of the engine 18 is transmitted to the generator 24 via the input shaft 32 and the generator shaft 34, whereby power generation is performed at the generator 24. The drive force of the drive motor 20 is transmitted to the drive wheels 22 via the motor shaft 36, the countershaft 38, and the differential mechanism 40, thereby rotating the drive wheels 22.

(Engine Driving Mode)

Figure 4:
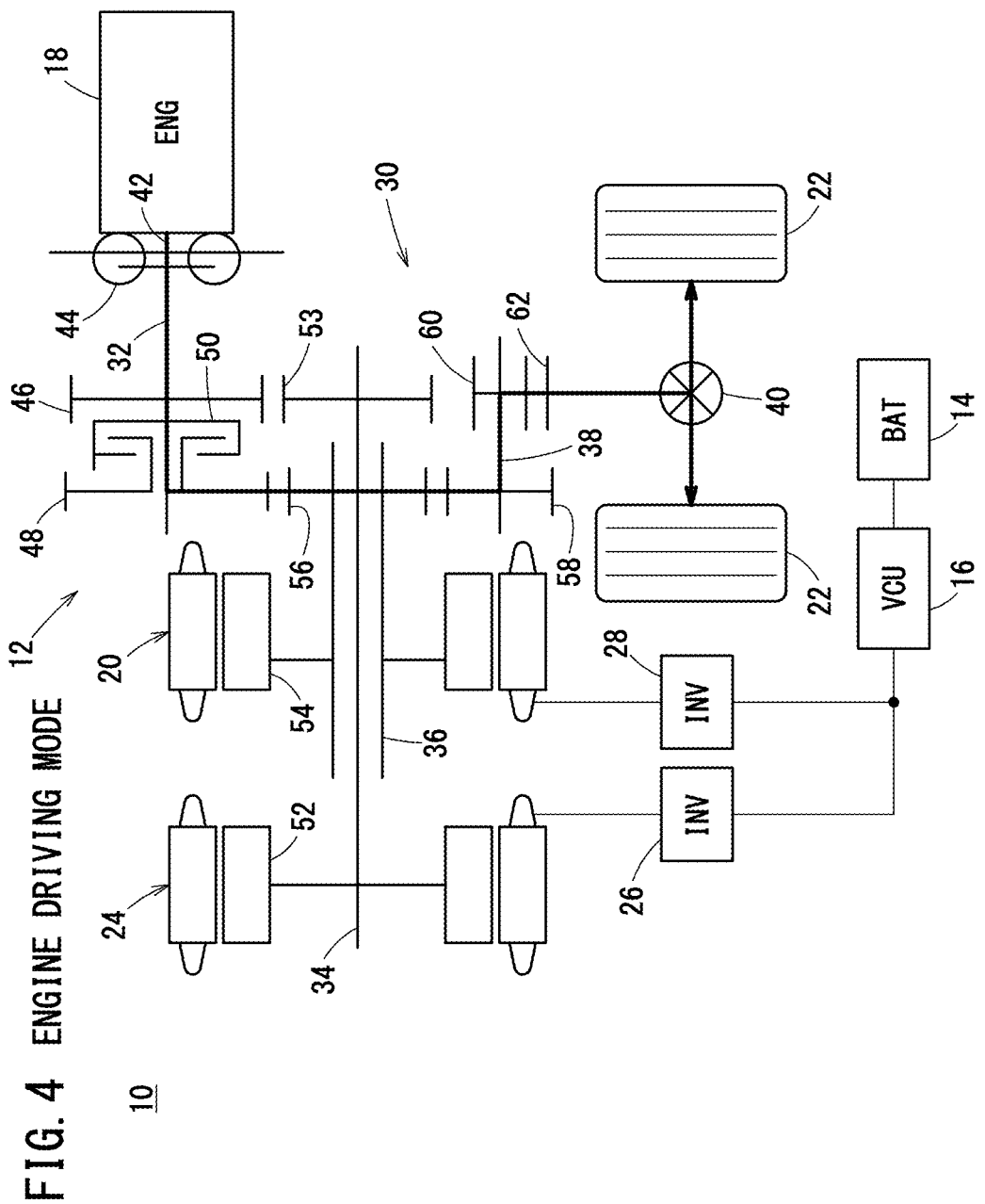
FIG. 4 is a diagram showing motive power and electric power supply paths in an engine driving mode.

FIG. 4 is a diagram showing motive power and electric power supply paths in an engine driving mode. In FIG. 4, the motive power supply path and the electric power supply path are indicated by arrows.

In the engine driving mode, the clutch 50 is engaged to achieve a state in which motive power is transmitted between the input shaft 32 and the output gear 48. The drive force of the engine 18 is transmitted to the drive wheels 22 via the input shaft 32, the motor shaft 36, the countershaft 38, and the differential mechanism 40, thereby rotating the drive wheels 22.

[Configuration of Vehicle Controller]

Figure 5:
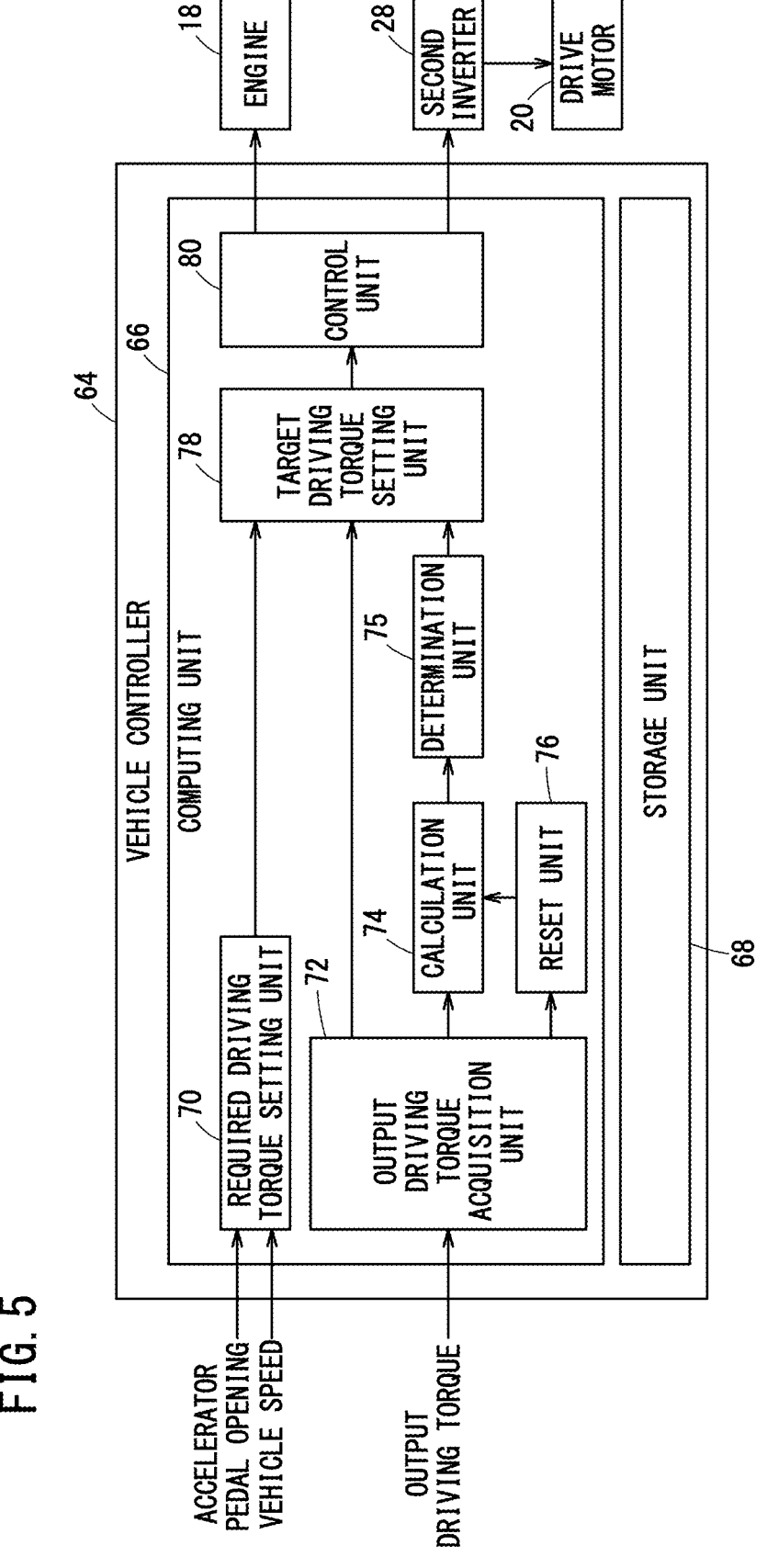
FIG. 5 is a control block diagram of a vehicle controller in one embodiment.

FIG. 5 is a control block diagram of a vehicle controller 64 in one embodiment. The vehicle controller 64 is mounted in the vehicle 10. The vehicle controller 64 controls the engine 18 and the drive motor 20.

The vehicle controller 64 includes a computing unit 66 and a storage unit 68. The computing unit 66 is a processor such as a CPU (Central Processing Unit), a GPU (Graphics Processing Unit), or the like. The computing unit 66 functions as a required driving torque setting unit 70, an output driving torque acquisition unit 72, a calculation unit 74, a determination unit 75, a reset unit 76, a target driving torque setting unit 78, and a control unit 80. The required driving torque setting unit 70, the output driving torque acquisition unit 72, the calculation unit 74, the determination unit 75, the reset unit 76, the target driving torque setting unit 78, and the control unit 80 are realized by the computing unit 66 executing programs stored in the storage unit 68. At least part of the required driving torque setting unit 70, the output driving torque acquisition unit 72, the calculation unit 74, the determination unit 75, the reset unit 76, the target driving torque setting unit 78, and the control unit 80 may be realized by an integrated circuit such as an ASIC (Application Specific Integrated Circuit), an FPGA (Field-Programmable Gate Array), or the like. At least part of the required driving torque setting unit 70, the output driving torque acquisition unit 72, the calculation unit 74, the determination unit 75, the reset unit 76, the target driving torque setting unit 78, and the control unit 80 may be realized by an electronic circuit including discrete devices.

The storage unit 68 is a computer-readable non-transitory tangible storage medium. The storage unit 68 is composed of a volatile memory (not shown) and a nonvolatile memory (not shown). The volatile memory is, for example, a RAM (Random Access Memory) or the like. The nonvolatile memory is, for example, ROM (Read Only Memory), flash memory, or the like. Data or the like are stored, for example, in the volatile memory. Programs, tables, maps, or the like are stored, for example, in the non-volatile memory. At least part of the storage unit 68 may be provided in the above-mentioned processor, integrated circuit, or the like. At least part of the storage unit 68 may be installed in a device connected to the vehicle 10 via a network.

The required driving torque setting unit 70 sets required driving torque for the engine 18 and the drive motor 20 according to an accelerator pedal opening and a vehicle speed. The required driving torque is set based on a preset map.

In the case of the EV driving mode or the series driving mode, the output driving torque acquisition unit 72 acquires the output driving torque of the drive motor 20. In the case of the engine driving mode, the output driving torque acquisition unit 72 acquires the output driving torque of the engine 18.

The calculation unit 74 calculates a temporal integral of the output driving torque from a time point when the output driving torque switches between positive and negative. The switching between the positive and negative of the output driving torque indicates that the output driving torque is turned from positive to negative or the output driving torque is turned from negative to positive. The determination unit 75 judges whether the temporal integral of the output driving torque has reached a predetermined value.

The calculation unit 74 may calculate a temporal integral of the output driving torque from a time point when the required driving torque switches between positive and negative. The switching between the positive and negative of the required driving torque indicates that the required driving torque is turned from positive to negative or the required driving torque is turned from negative to positive.

When the output driving torque that has been turned from positive to negative returns to positive, the reset unit 76 resets the temporal integral calculated by the calculation unit 74. When the output driving torque that has turned from negative to positive returns to negative, the reset unit 76 resets the temporal integral calculated by the calculation unit 74. When the temporal integral is reset, the calculation unit 74 calculates an integral of the output driving torque again.

When the required driving torque that has turned from positive to negative returns to positive, the reset unit 76 may reset the temporal integral calculated by the calculation unit 74. When the required driving torque that has turned from negative to positive returns to negative, the reset unit 76 may reset the temporal integral calculated by the calculation unit 74.

The target driving torque setting unit 78 sets target driving torque according to the required driving torque. Normally, the target driving torque setting unit 78 sets the required driving torque to the target driving torque. On the other hand, when the output driving torque switches between positive and negative, the target driving torque setting unit 78 performs the torque limiting process. When the torque limiting process is performed, the absolute value of the target driving torque is limited to be equal to or less than a predetermined limit value. When the required driving torque switches between positive and negative, the target driving torque setting unit 78 may perform the torque limiting process.

In the case of the EV driving mode or the series driving mode, the control unit 80 controls the drive motor 20 via the inverter 28. In the case of the engine driving mode, the control unit 80 controls a throttle opening of the engine 18.

[Drive Source Control Process]

FIG. 6 is a flowchart of a drive source control process performed by the vehicle controller 64 in one embodiment. The drive source control process is repeatedly executed at a predetermined cycle C.

In step S1, the output driving torque acquisition unit 72 acquires the output driving torque of the drive motor 20 or the output driving torque of the engine 18 according to the driving mode. That is, when the driving modes are the EV driving mode and the series driving mode, the output driving torque acquisition unit 72 acquires the output driving torque of the drive motor 20. When the driving mode is the engine driving mode, the output driving torque acquisition unit 72 acquires the output driving torque of the engine 18. Then, the process proceeds to step S2.

In step S2, the required driving torque setting unit 70 sets the required driving torque in accordance with the accelerator pedal opening and the vehicle speed. Then, the process proceeds to step S3.

In step S3, the target driving torque setting unit 78 determines whether the output driving torque has switched between positive and negative. The target driving torque setting unit 78 compares the output driving torque acquired in step S1 of the previous cycle with the output driving torque acquired in step S1 of the current cycle to determine whether the output driving torque has switched between positive and negative.

Alternatively, in step S3, the target driving torque setting unit 78 may determine whether the required driving torque has switched between positive and negative. The target driving torque setting unit 78 compares the required driving torque set in step S2 of the previous cycle with the required driving torque set in step S2 of the current cycle and determines whether the required driving torque has switched between positive and negative.

When it is determined in step S3 that the output driving torque or the required driving torque has switched between positive and negative (step S3: YES), the process proceeds to step S4. In step S4, the target driving torque setting unit 78 sets a torque limit flag to "1". Then, the process proceeds to step S5. In step S5, the reset unit 76 resets the temporal integral.

When it is determined in step S3 that the output driving torque or the required driving torque has not switched between positive and negative (step S3: NO), the process proceeds to step S6. In step S6, the target driving torque setting unit 78 determines whether the torque limit flag is "1".

If it is determined in step S6 that the torque limit flag is "1" (step S6: YES), the process proceeds to step S7. In step S7, the calculation unit 74 calculates the temporal integral of the output driving torque. The calculation unit 74 adds, to the temporal integral calculated in step S7 of the previous cycle, a value acquired by multiplying the output driving torque acquired in step S1 of the current cycle by the predetermined cycle C, thereby calculating the temporal integral. Then, the process proceeds to step S8.

In step S8, the determination unit 75 determines whether the temporal integral of the output driving torque has reached a predetermined value. The determination unit 75 determines that the temporal integral of the output driving torque has reached the predetermined value when the absolute value of the temporal integral of the output driving torque is equal to or larger than the predetermined value. The determination unit 75 determines that the temporal integral of the output driving torque has not yet reached the predetermined value when the absolute value of the temporal integral of the output driving torque is less than the predetermined value.

After the above-described step S5, or when it is determined in step S8 that the temporal integral of the output driving torque has not yet reached the predetermined value (step S8: NO), the process proceeds to step S9. In step S9, the target driving torque setting unit 78 performs a torque limiting process. The target driving torque is set by the torque limiting process.

When it is determined in step S8 that the temporal integral of the output driving torque has reached the predetermined value (step S8: YES), the process proceeds to step S10. In step S10, the target driving torque setting unit 78 sets the torque limit flag to "0".

After step S10 or when it is determined in step S6 that the torque limit flag is "0" (step S6: NO), the process proceeds to step S11. In step S11, the target driving torque setting unit 78 sets the target driving torque to the required driving torque.

After the target driving torque is set in step S9 or step S11, the process proceeds to step S12. In step S12, the control unit 80 controls the drive motor 20 or the engine 18, which is the drive source, according to the driving mode. That is, when the driving modes are the EV driving mode and the series driving mode, the control unit 80 controls the drive motor 20. When the driving mode is the engine driving mode, the control unit 80 controls the engine 18. Then, the drive source control process is terminated.

[Torque Limiting Process]

Figure 7:
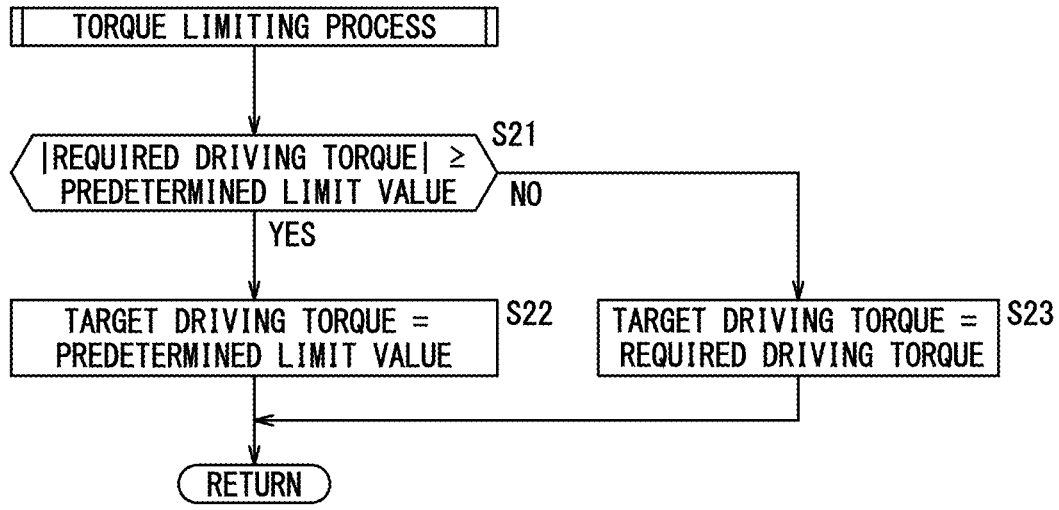
FIG. 7 is a flowchart showing a torque limiting process performed in a target driving torque setting unit.

FIG. 7 is a flowchart showing the torque limiting process performed by the target driving torque setting unit 78 in the aforementioned step S9.

In step S21, the target driving torque setting unit 78 determines whether the absolute value of the required driving torque is equal to or larger than the predetermined limit value.

When it is determined in step S21 that the absolute value of the required driving torque is equal to or larger than the predetermined limit value (step S21: YES), the process proceeds to step S22. In step S22, the target driving torque setting unit 78 sets the target driving torque to the predetermined limit value. When the required driving torque is negative, the target driving torque is set to a negative predetermined limit value. Then, the torque limiting process is terminated.

When it is determined in step S21 that the absolute value of the required driving torque is less than the predetermined limit value (step S21: NO), the process proceeds to step S23. In step S23, the target driving torque setting unit 78 sets the target driving torque to the required driving torque. Then, the torque limiting process is terminated.

[Example Operations of Vehicle Before and After Torque Limiting Process (1)]

Figure 8:
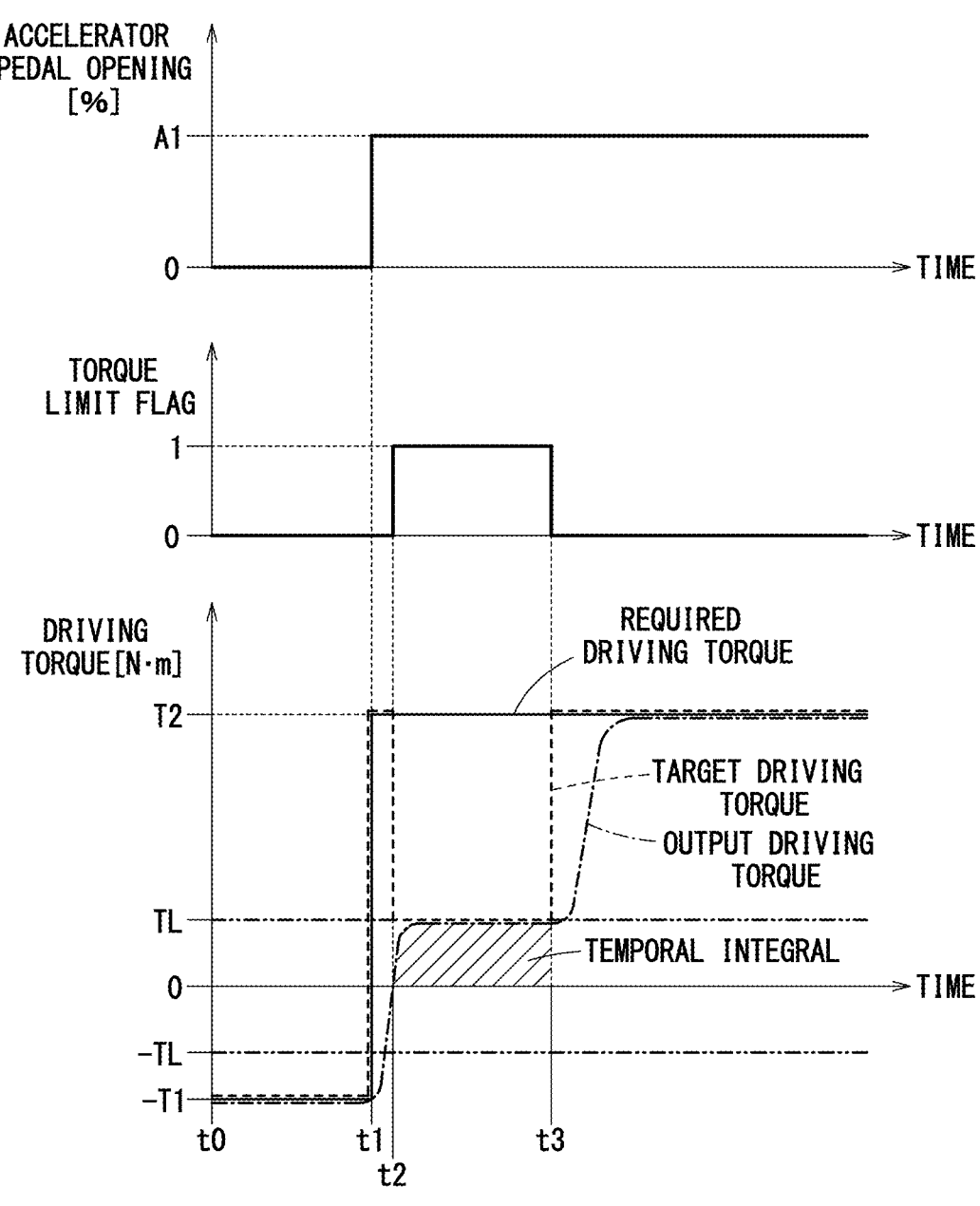
FIG. 8 is a time chart showing actions of a vehicle before and after the torque limiting process.

FIG. 8 is a time chart showing the operation of the vehicle 10 before and after the torque limiting process. The time chart at the top in FIG. 8 is a time chart of the accelerator pedal opening. The second time chart from the top in FIG. 8 is a time chart of the torque limit flag. The bottom time chart in FIG. 8 is the time chart of the driving torque. The torque chart shown in FIG. 8 illustrates an image of the change in the operation of the vehicle 10 before and after the torque limiting process.

(Time t0 to Time t1)

In the period from time to t0 time t1 in FIG. 8, the accelerator pedal opening is 0 [%]. When the accelerator pedal opening is 0 [%], the required driving torque is set to torque—T1 [N·m]. In this period, because the output driving torque is not switched between positive and negative, the torque limit flag is "0" and the torque limiting process is not performed. Therefore, the target driving torque is not limited, and the target driving torque is set to the same torque—T1 [N·m] as the required driving torque. The drive motor 20 or the engine 18 is controlled based on the target driving torque, whereby the output driving torque is represented by torque—T1 [N·m].

(Time t1 to Time t2)

At time t1 in FIG. 8, the accelerator pedal is depressed, and the accelerator pedal opening becomes the opening A1 [%]. At this time, the required driving torque is set to torque T2 [N·m]. Because the output driving torque does not switch between positive and negative during the period from time t1 to time t2, the torque limit flag is "0" and the torque limiting process is not performed. Therefore, the target driving torque is not limited, and the target driving torque is set to the same torque T2 [N·m] as the required driving torque. The drive motor 20 or the engine 18 is controlled based on the target driving torque, and the output driving torque is increased.

(Time t2 to Time t3)

At time t2 in FIG. 8, the output driving torque changes from negative to positive. At time t2, the torque limit flag is switched from "0" to "1", and the torque limiting process is started. Therefore, the absolute value of the target driving torque is limited to be equal to or less than a predetermined limit value TL [N·m]. In the period from time point t2 to time point t3, the required driving torque is larger than the predetermined limit value TL [N·m], so the target driving torque is set to the predetermined limit value TL [N·m]. The drive motor 20 or the engine 18 is controlled based on the target driving torque set to the predetermined limit value TL [N·m] and then the output driving torque approaches the predetermined limit value TL [N·m].

At time t2 when the output driving torque turns from negative to positive, the calculation of the temporal integral of the output driving torque starts.

(After Time t3)

At time t3 in FIG. 8, the temporal integral of the output driving torque reaches the predetermined value. At time t3, the torque limit flag is switched from "1" to "0", and the torque limiting process is terminated. Therefore, the limit on the target driving torque is lifted, and the target driving torque is set to the same torque T2 [N·m] as the required driving torque. The drive motor 20 or the engine 18 is controlled based on the target driving torque, and the output driving torque is increased again.

(Suppression of Rattling Noise by Torque Limiting Process)

In the period before time t2 in FIG. 8, the output driving torque is negative and the torque is transmitted from the drive wheels 22 side to the drive motor 20 side or from the drive motor 20 side to the engine 18 side. On the other hand, in the period after time t2, the output driving torque is positive and the torque is transmitted from the drive motor 20 side to the drive wheels 22 side or from the engine 18 side to the drive wheel 22 side. Therefore, the meshing tooth surfaces between the gears in the drive unit 12 are switched around the time point t2. At this time, because the tooth surfaces of the gears collide with each other, there is a possibility that rattling noises will occur.

During the period from time t2 to time t3, the torque limiting process is performed. The absolute value of the output driving torque is limited to the predetermined limit value TL [N·m] or less by the torque limiting process. Therefore, impacts when the tooth surfaces of the gears collide with each other can be reduced and the magnitude of the rattling noises can be suppressed.

[Example Operations of Vehicle Before and After Torque Limiting Process (2)]

Figure 9:
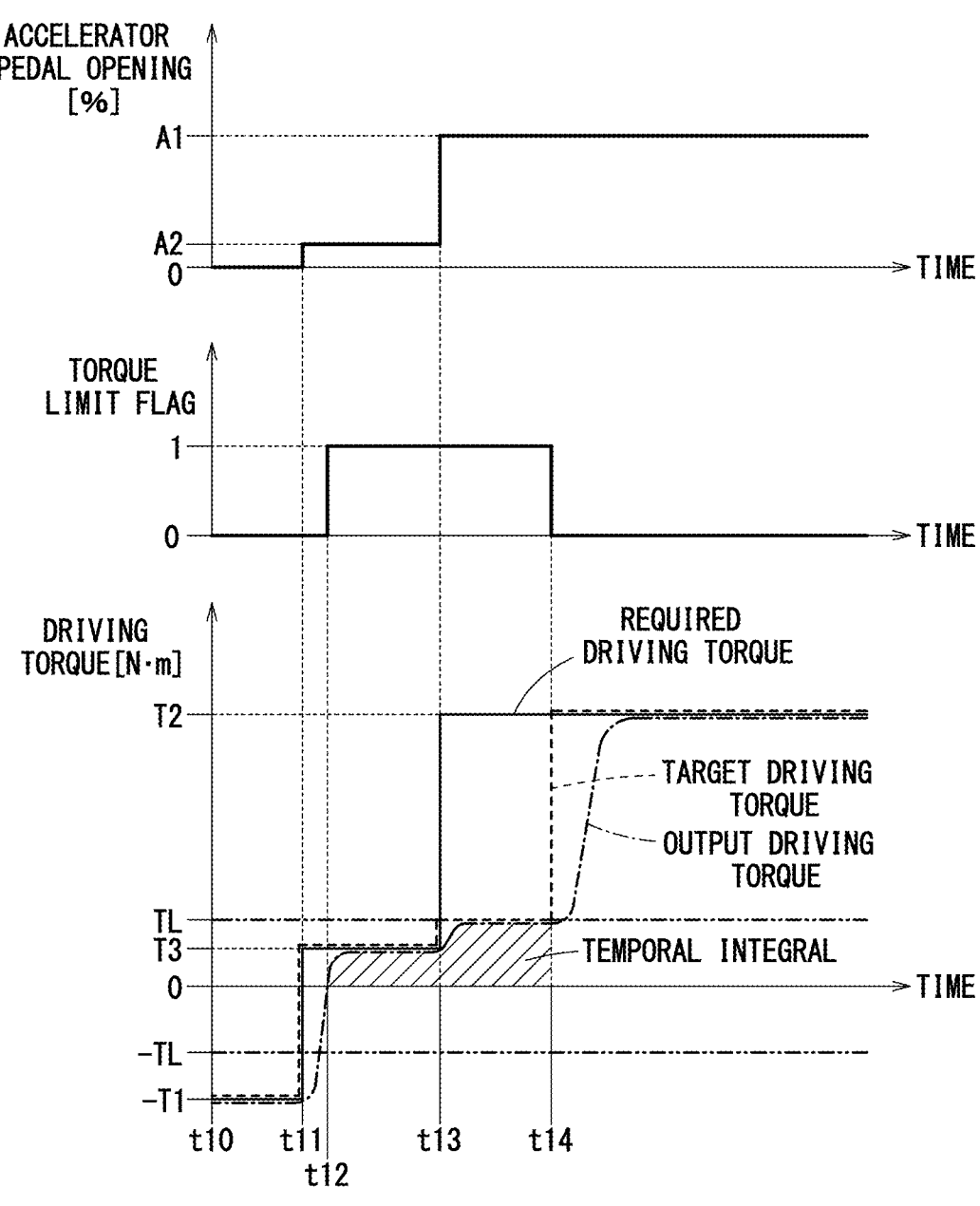
FIG. 9 is a time chart showing the operation of a vehicle before and after the torque limiting process.

FIG. 9 is a time chart showing the operation of the vehicle 10 before and after the torque limiting process. The time chart at the top in FIG. 9 is a time chart of the accelerator pedal opening. The second time chart from the top in FIG. 9 is a time chart of the torque limit flag. The bottom time chart in FIG. 9 is the time chart of the driving torque. The torque chart shown in FIG. 9 illustrates an image of the change in the operation of the vehicle 10 before and after the torque limiting process.

(Time t10 to Time t11)

In the period from time t10 to time t11 in FIG. 9, the accelerator pedal opening is 0 [%]. When the accelerator pedal opening is 0 [%], the required driving torque is set to torque—T1 [N·m]. In this period, because the output driving torque is not switched between positive and negative, the torque limit flag is "0" and the torque limiting process is not performed. Therefore, the target driving torque is not limited, and the target driving torque is set to the same torque—T1 [N·m] as the required driving torque. The drive motor 20 or the engine 18 is controlled based on the target driving torque, whereby the output driving torque is represented by torque—T1 [N·m].

(Time t11 to Time t12)

At time t11 in FIG. 9, the accelerator pedal is depressed, and the accelerator pedal opening becomes the opening A2 [%]. At this time, the required driving torque is set to torque T3 [N·m]. Because the output driving torque does not switch between positive and negative during the period from time point t11 to time point t12, the torque limit flag is "0" and the torque limiting process is not performed. Therefore, the target driving torque is not limited, and the target driving torque is set to the same torque T3 [N·m] as the required driving torque. The drive motor 20 or the engine 18 is controlled based on the target driving torque, and the output driving torque is increased.

(Time t12 to Time t13)

At time t12 in FIG. 9, the output driving torque changes from negative to positive. At time t12, the torque limit flag is switched from "0" to "1", and the torque limiting process is started. Therefore, the absolute value of the target driving torque is limited to be equal to or less than a predetermined limit value TL [N·m]. In the period from time point t12 to time point t13, because the required driving torque is smaller than the predetermined limit value TL [N·m], the target driving torque is set to the same torque T3 [N·m] as the required driving torque. The drive motor 20 or the engine 18 is controlled based on the target driving torque set to the torque T3 [N·m], and the output driving torque approaches the torque T3 [N·m].

At time t12 when the output driving torque turns from negative to positive, the calculation of the temporal integral of the output driving torque starts.

(Time t13 to Time t14)

At time t13 in FIG. 9, the accelerator pedal is further depressed and the accelerator pedal opening degree becomes A1 [%], which is larger than A2 [%]. As the accelerator pedal opening increases, the demanded driving torque increases to the torque T2 [N·m]. Because the temporal integral of the output driving torque does not reach the predetermined value in the period from time point t13 to time point t14, the torque limit flag is maintained at "1" and the torque limiting process is continued.

In the period from time point t13 to time point t14, the required driving torque is larger than the predetermined limit value TL [N·m] and thus the target driving torque is set to the predetermined limit value TL [N·m]. The drive motor 20 or the engine 18 is controlled based on the target driving torque set to the predetermined limit value TL [N·m] and then the output driving torque approaches the predetermined limit value TL [N·m].

(After Time Point t14)

At time t14 in FIG. 9, the temporal integral of the output driving torque reaches the predetermined value. At time t14, the torque limit flag is switched from "1" to "0" and the torque limiting process is terminated. Therefore, the limit on the target driving torque is lifted, and the target driving torque is set to the same torque T2 [N·m] as the required driving torque. The drive motor 20 or the engine 18 is controlled based on the target driving torque, and the output driving torque is increased again.

(Extension of Torque Limiting Process Period)

The torque limiting process is performed during the period from time t12 to time t14 in FIG. 9. The absolute value of the output driving torque is limited to the predetermined limit value TL [N·m] or less by the torque limiting process.

In the period from time point t12 to time point t13 during which the torque limiting process is performed, the required driving torque (torque T3 [N·m]) is smaller than the predetermined limit value TL [N·m] and thus the target driving torque is set to torque T3 [N·m], which is smaller than the predetermined limit value TL [N·m]. Therefore, although the period for which the backlash of the gear is eliminated becomes longer, the period for which the torque limiting process is performed also becomes longer, so that impacts when the tooth surfaces of the gears collide with each other can be reduced and the magnitude of the rattling noises can be suppressed.

[Example Operations of Vehicle Before and After Torque Limiting Process (3)]

Figure 10:
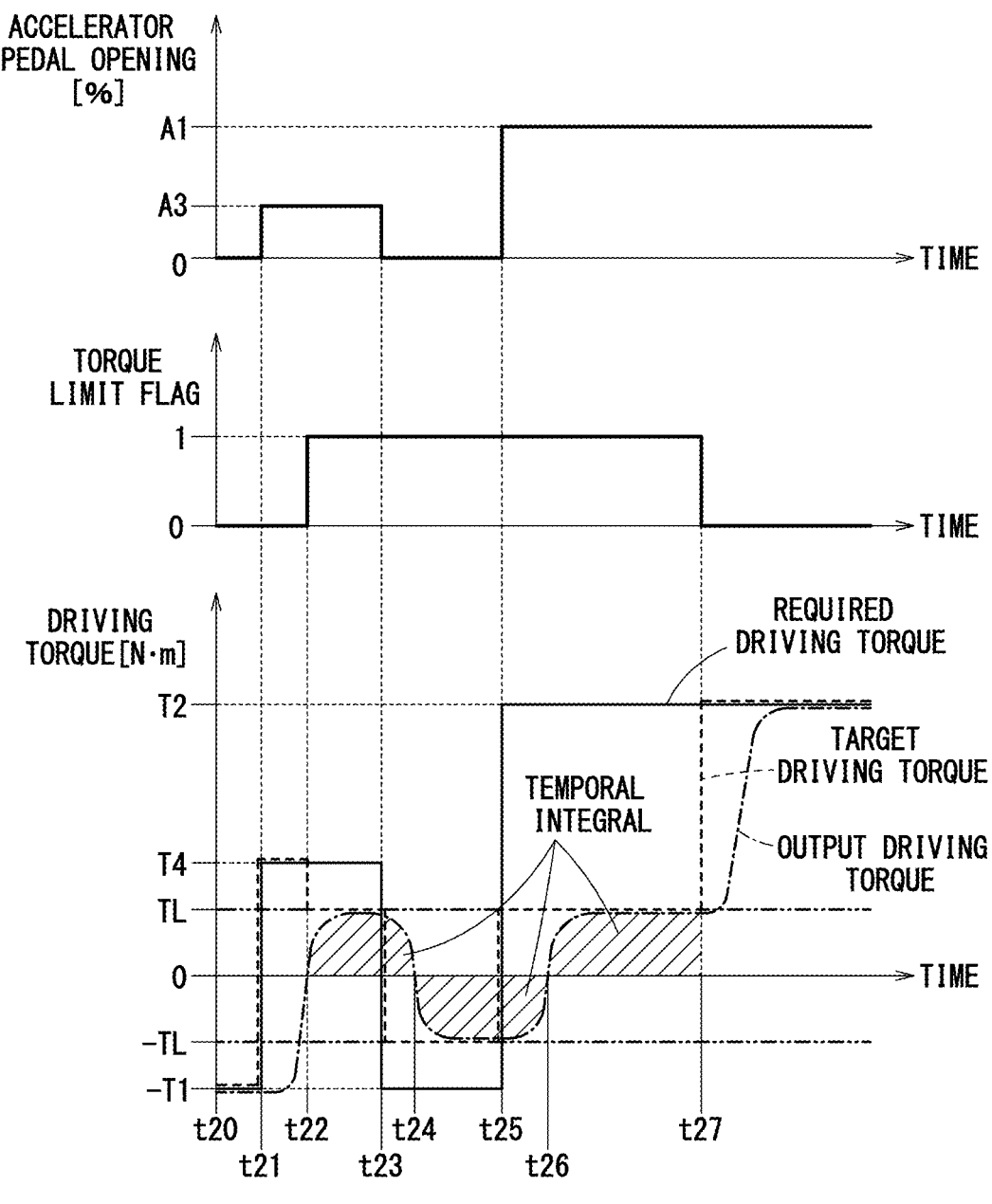
FIG. 10 is a time chart showing the operation of a vehicle before and after the torque limiting process.

FIG. 10 is a time chart showing the operation of the vehicle 10 before and after the torque limiting process. The time chart at the top in FIG. 10 is a time chart of the accelerator pedal opening. The second time chart from the top in FIG. 10 is a time chart of the torque limit flag. The bottom time chart in FIG. 10 is the time chart of the driving torque. The torque chart shown in FIG. 10 illustrates an image of the change in the operation of the vehicle 10 before and after the torque limiting process.

(Time Point t20 to Time Point t21)

From time t20 to time t21 in FIG. 10, the accelerator pedal opening is 0 [%]. When the accelerator pedal opening is 0 [%], the required driving torque is set to torque-T1 [N·m]. In this period, because the output driving torque is not switched between positive and negative, the torque limit flag is "0" and the torque limiting process is not performed. Therefore, the target driving torque is not limited, and the target driving torque is set to the same torque-T1 [N·m] as the required driving torque. The drive motor 20 or the engine 18 is controlled based on the target driving torque, whereby the output driving torque is represented by torque—T1 [N·m].

(Time Point t21 to Time Point t22)

At time t21 in FIG. 10, the accelerator pedal is depressed, and the accelerator pedal opening becomes the opening A3 [%]. At this time, the required driving torque is set to torque T4 [N·m]. Because the output driving torque does not switch between positive and negative during the period from time point t21 to time point t22, the torque limit flag is "0" and the torque limiting process is not performed. Therefore, the target driving torque is not limited, and the target driving torque is set to the same torque T4 [N·m] as the required driving torque. The drive motor 20 or the engine 18 is controlled based on the target driving torque, and the output driving torque is increased.

(Time Point t22 to Time Point t23)

At time point t22 in FIG. 10, the output driving torque changes from negative to positive. At time t22, the torque limit flag is switched from "0" to "1", and the torque limiting process is started. Therefore, the absolute value of the target driving torque is limited to be equal to or less than a predetermined limit value TL [N·m]. In the period from time point t22 to time point t23, the required driving torque is larger than the predetermined limit value TL [N·m] and thus the target driving torque is set to the predetermined limit value TL [N·m]. The drive motor 20 or the engine 18 is controlled based on the target driving torque set to the predetermined limit value TL [N·m] and then the output driving torque approaches the predetermined limit value TL [N·m].

At time t22 when the output driving torque turns from negative to positive, the calculation of the temporal integral of the output driving torque starts.

(Time Point t23 to Time Point t24)

At time t23 in FIG. 10, the accelerator pedal is returned and the accelerator pedal opening becomes 0 [%]. When the accelerator pedal opening is 0 [%], the required driving torque is set to negative torque—T1 [N·m]. Because the temporal integral of the output driving torque does not reach the predetermined value in the period from time point t23 to time point t24, the torque limit flag is maintained at "1" and the torque limiting process is continued. Therefore, the absolute value of the target driving torque is limited to be equal to or less than a predetermined limit value TL [N·m]. In the period from time point t23 to time point t24, the required driving torque is smaller than the predetermined limit value—TL [N·m] and thus the target driving torque is set to the predetermined limit value—TL [N·m]. The drive motor 20 or the engine 18 is controlled based on the target driving torque set to the predetermined limit value—TL [N·m] and then the output driving torque approaches the predetermined limit value—TL [N·m].

(Time t24 to Time t25)

At time t24 in FIG. 10, the output driving torque changes from positive to negative, and thus the calculation of the temporal integral of the output driving torque is reset. At time t24, the calculation of the temporal integral of the output driving torque is started again.

(Time t25 to Time t26)

At time t25 in FIG. 10, the accelerator pedal is depressed, and the accelerator pedal opening degree becomes the opening degree A1 [%]. At this time, the required driving torque is set to positive torque T2 [N·m]. Because the temporal integral of the output driving torque does not reach the predetermined value in the period from time point t25 to time point t26, the torque limit flag is maintained at "1" and the torque limiting process is continued.

In the period from time point t25 to time point t26, the required driving torque is larger than the predetermined limit value TL [N·m] and thus the target driving torque is set to the predetermined limit value TL [N·m]. The drive motor 20 or the engine 18 is controlled based on the target driving torque set to the predetermined limit value TL [N·m] and then the output driving torque approaches the predetermined limit value TL [N·m].

(Time t26 to t27)

At time t26 in FIG. 10, the output driving torque changes from negative to positive, and thus the calculation of the temporal integral of the output driving torque is reset. At time t26, the calculation of the temporal integral of the output driving torque is started again.

(After Time Point t27)

At time t27 in FIG. 10, the temporal integral of the output driving torque reaches the predetermined value. At time t27, the torque limit flag is switched from "1" to "0", and the torque limiting process is terminated. Therefore, the limit on the target driving torque is lifted, and the target driving torque is set to the same torque T2 [N·m] as the required driving torque. The drive motor 20 or the engine 18 is controlled based on the target driving torque, and the output driving torque is increased again.

(Resetting of Temporal Integral of Output Driving Torque)

The torque limiting process is performed during the period from time t22 to time t27 in FIG. 10. The torque limiting process limits the output driving torque to be less than or equal to the predetermined limit value TL [N·m] or to the predetermined limit value-TL [N·m].

During the period in which the torque limiting process is performed, the output driving torque turns from positive to negative at time t24, and the output driving torque turns from negative to positive at time t26. Around time t24 and around time t26, the meshing tooth surfaces between the gears in the drive unit 12 are switched. Therefore, the period for which the backlash of the gear is eliminated becomes longer but the temporal integral of the output driving torque is reset at time points t24 and t26. Thus, the period for which the torque limiting process is performed also becomes longer, resulting in that impacts when the tooth surfaces of the gears collide with each other can be reduced and the magnitude of the rattling noises can be suppressed.

With respect to the above embodiments, the following supplementary notes are further disclosed.

(Supplementary Note 1)

A vehicle controller (64) of the present disclosure includes a target driving torque setting unit (78) configured to set a target driving torque for a drive source (18, 20) that drives a drive wheel (22) provided to a vehicle (10), an output driving torque acquisition unit (72) configured to acquire the output driving torque of the drive source, a control unit (80) configured to control the drive source in accordance with the target driving torque, a calculation unit (74) configured to calculate a temporal integral of the output driving torque after the output driving torque switches between positive and negative, or calculate a temporal integral of the target driving torque after the required driving torque for the drive source switches between positive and negative, and a determination unit (75) configured to determine whether the temporal integral calculated by the calculation unit has reached a predetermined value, wherein when the output driving torque or the required driving torque switches between positive and negative, the target driving torque setting unit executes a torque limiting process that limits an absolute value of the target driving torque to be equal to or less than a predetermined limit value, and the target driving torque setting unit terminates the torque limiting process based on a determination that the temporal integral has reached the predetermined value. This can reduce the rattling noise of the gear regardless of the magnitude of the output driving torque.

(Supplementary Note 2)

The vehicle controller according to Supplementary note 1 may further include a reset unit (76) configured to reset the temporal integral of the output driving torque when the output driving torque or the required driving torque that has turned from positive to negative turns positive again, or when the output driving torque or the required driving torque that has turned from negative to positive turns negative again. This can reduce the rattling noise of the gear regardless of the increase or decrease of the output driving torque.

(Supplementary Note 3)

A vehicle of the present disclosure is provided with the vehicle controller according to Supplementary note 1 or 2. This can reduce the rattling noise of the gear regardless of the magnitude of the output driving torque.

(Supplementary Note 4)

A vehicle control method of the present disclosure includes a target driving torque setting step of setting a target driving torque of a drive source that drives a drive wheel provided to a vehicle, an output driving torque acquisition step of acquiring an output driving torque of the drive source, a control step of controlling the drive source in accordance with the target driving torque, a calculation step of calculating a temporal integral of the output driving torque after the output driving torque switches between positive and negative, or calculating a temporal integral of the target driving torque after the required driving torque for the drive source switches between positive and negative, and a determination step of determining whether the temporal integral calculated in the calculation step has reached a predetermined value, wherein when the output driving torque or the required driving torque is switched between positive and negative, in the target driving torque setting step, a torque limiting process is performed for limiting an absolute value of the target driving torque to be equal to or less than a predetermined limit value, and the torque limiting process is terminated in the target driving torque setting step based on a fact that it is determined in the determining step that the temporal integral has reached the predetermined value. This can reduce the rattling noise of the gear regardless of the magnitude of the output driving torque.

(Supplementary Note 5)

The vehicle control method according to Supplementary note 4 may further include a reset step of resetting the temporal integral of the output driving torque when the output driving torque or the required driving torque that has turned from positive to negative turns positive again, or when the output driving torque or the required driving torque that has turned from negative to positive turns negative again. This can reduce the rattling noise of the gear regardless of the increase or decrease of the output driving torque.

(Supplementary Note 6)

A program of the present disclosure causes a computer to execute the vehicle control method according to Supplementary note 4 or 5. This can reduce the rattling noise of the gear regardless of the magnitude of the output driving torque.

Although the present disclosure has been detailed, the present disclosure is not limited to the individual embodiments described above. These embodiments may be variously added, replaced, altered, partially deleted, etc., without departing from the scope of the present disclosure or the intent of the present disclosure as derived from the claims and their equivalents. These embodiments can also be implemented in combination. For example, in the above-described embodiment, the order of the operations and the order of the processes are shown as an example, and are not limited to these. The same applies to the case where numerical values or mathematical expressions are used in the description of the above-described embodiment.

The invention claimed is:

1. A vehicle controller comprising one or more processors that execute computer-executable instructions stored in memory, wherein the one or more processors execute the computer-executable instructions to cause the vehicle controller to:

set a target driving torque for a drive source that drives a drive wheel provided to a vehicle;

acquire an output driving torque of the drive source;

control the drive source in accordance with the target driving torque;

calculate a temporal integral of the output driving torque after the output driving torque switches between positive and negative, or calculate a temporal integral of the target driving torque after a required driving torque for the drive source switches between positive and negative;

determine whether the temporal integral calculated has reached a predetermined value;

execute, when the output driving torque or the required driving torque switches between positive and negative, a torque limiting process that limits an absolute value of the target driving torque to be equal to or less than a predetermined limit value; and terminate the torque limiting process based on a determination that the temporal integral has reached the predetermined value.

2. The vehicle controller according to claim 1, wherein the one or more processors execute the computer-executable instructions to cause the vehicle controller to reset the temporal integral of the output driving torque when the output driving torque or the required driving torque that has turned from positive to negative turns to positive again or when the output driving torque or the required driving torque that has turned from negative to positive turns to negative again.

3. A vehicle comprising the vehicle controller according to claim 1.

4. A vehicle control method comprising:

a target driving torque setting step of setting a target driving torque of a drive source that drives a drive wheel provided to a vehicle;

an output driving torque acquisition step of acquiring an output driving torque of the drive source;

a control step of controlling the drive source in accordance with the target driving torque;

a calculation step of calculating a temporal integral of the output driving torque after the output driving torque switches between positive and negative, or calculating a temporal integral of the target driving torque after a required driving torque for the drive source switches between positive and negative; and a determination step of determining whether the temporal integral calculated in the calculation step has reached a predetermined value, wherein when the output driving torque or the required driving torque switches between positive and negative, in the target driving torque setting step, a torque limiting process is performed for limiting an absolute value of the target driving torque to be equal to or less than a predetermined limit value, and the torque limiting process is terminated in the target driving torque setting step based on a determination in the determining step that the temporal integral has reached the predetermined value.

5. The vehicle control method according to claim 4, further comprising a reset step of resetting the temporal integral of the output driving torque when the output driving torque or the required driving torque that has turned from positive to negative turns to positive again, or when the output driving torque or the required driving torque that has turned from negative to positive turns to negative again.

6. A computer-readable non-transitory storage medium storing a program for causing a computer to execute the vehicle control method according to claim 4.

* * * * *